United States Patent Office 3,169,412
Patented Feb. 16, 1965

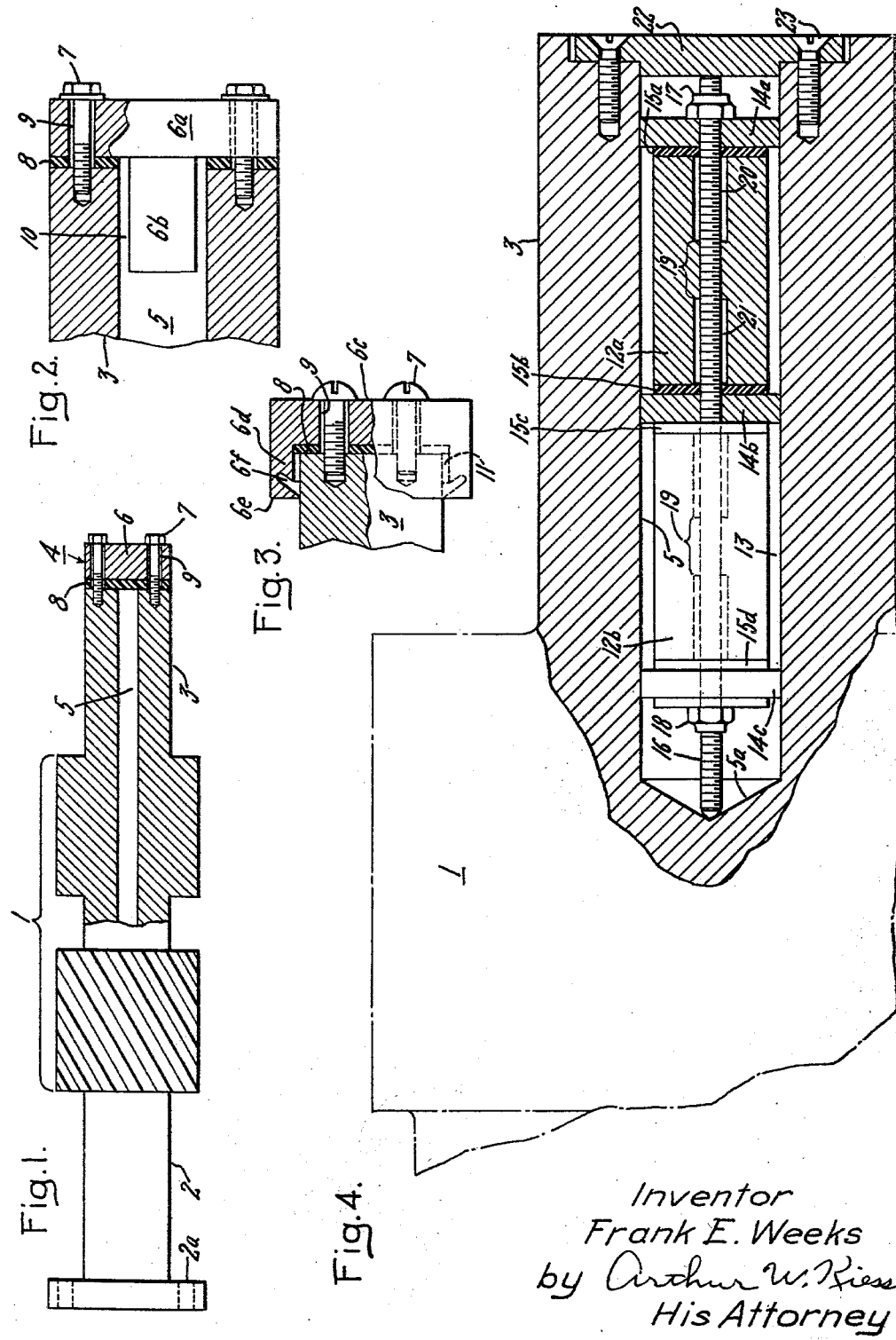

3,169,412
VIBRATION DAMPING MEANS FOR
GEAR PINION
Frank E. Weeks, Topsfield, Mass., assignor to General
Electric Company, a corporation of New York
Filed July 12, 1963, Ser. No. 294,602
7 Claims. (Cl. 74—574)

This invention relates to vibration damping means for rotors, particularly to means for quieting the noise generated by a relatively long, small diameter pinion as used in reduction gearing.

For many applications, as for instance in marine propulsion gearing for ships in passenger service, it is desirable to reduce to a minimum the vibration generated in reduction gearing, which otherwise shows up as objectionable noise. In the large diameter "bull gear" of such gearing, it is relatively easy to incorporate known vibration damping devices. On the other hand, the pinion of such gearing is ordinarily of an elongated configuration, having a length very substantially greater than its diameter, and an over-all diameter only very slightly larger than the diameter of the journal end portions of the rotor, just adequate to provide metal for cutting the gear teeth thereon. Such a gear pinion proves very difficult to provide with vibration damping means.

The primary object of the present invention is to provide improved vibration damping means for elongated gear pinions of the type described.

Another object is to provide quieting means for a reduction gear pinion having end journal portions and gear teeth machined from a single forging.

A further object is to provide improved vibration damping devices which may be readily applied to the pinions of reduction gears found to be noisy after they are in service.

Another object is to provide vibration damping means of the type described which may be housed within the journal end portion of the gear pinion so as to effect no increase in either diameter or axial length of the rotor.

Other objects and advantages will become apparent from the following description taken in connection with the accompanying drawings, in which:

FIG. 1 illustrates a herringbone reduction gear pinion of the type to which the invention is particularly applicable, and incorporating the invention in its simplest form, FIG. 2 is a detail view of a modification of the vibration damping device of FIG. 1, FIG. 3 is a still further modification of the vibration damping means, and FIG. 4 illustrates a form of vibration damper in accordance with the invention, which may be housed within the journal end portion of the gear pinion.

Briefly stated, the invention is practiced by providing a mass having substantial inertia and supported in cooperative relation with the end portion of the pinion journal in such a manner as to be free to vibrate in a direction transverse to the axis of the pinion by a limited amount, with vibration damping material disposed between the mass and the pinion journal, the support for the mass being such that the vibration damping material is subjected to shear forces.

Referring now more particularly to FIG. 1, the invention is illustrated as applied to a reduction gear pinion having a central portion defining herringbone teeth 1 and journal end portions 2, 3. The journal end portion 2 is provided with a coupling flange 2a, and the other journal end portion 3 is provided with a vibration damping device shown generally at 4. It will be observed that the pinion is of small diameter and relatively great length; and such pinions will ordinarily have a length on the order of at least four times the diameter of the pinion. They also are frequently provided with an axial bore 5 for lightening the rotor.

The vibration damping device 4 comprises a disk member 6 having substantial mass and secured to the end face of the journal 3 by a plurality of circumferentially spaced bolts 7. A layer of vibration damping material 8 is disposed between the mass 6 and the journal end portion 3.

As will be apparent from FIG. 1, the supporting bolts 7 are disposed through holes in disk 6 of such a diameter as to form a clearance space 9 around each bolt. Thus, the mass 6 is free to vibrate transversely to the axis of the pinion to a limited degree, by reason of the substantial unsupported length of the bolts 7. Such relative vibratory movement tends to impose shear forces on the vibration damping material 8. This is important, since vibration damping material is found to produce its maximum effectiveness when stressed in shear.

The vibration damping material 8 may be of any suitable form, for instance chromate-impregnated felt. Such material is manufactured by the Anchor Packing Company under the trade name "Anchorite." Material designated "Anchorite 11–N–2" has been found particularly useful and is available in a variety of widths and thicknesses. This vibration damping material may also be that sold by the Lord Manufacturing Company as Type DC–322, which is a relatively soft epoxy-bonded material of a proprietary composition, the exact nature of which is unknown to me. These vibration damping materials are relatively stiff and have excellent vibration absorbing qualities when loaded in shear.

It is important to note that, up to a certain point, the vibration damping effectiveness of the mass 6 is a function of its weight, and it appears that the optimum weight for the mass 6 is on the order of 5% of the weight of the entire rotor.

The operation of the vibration damping device of FIG. 1 will be apparent from the above description of the structure. The pinion teeth 1 passing through the mesh point with the bull gear (not shown) impose vibration-inducing impulses at the middle of the rotor, which show up as objectionable noise unless appropriately damped. The vibrations generated by the gears are communicated to the journal end portion 3 and the vibration damper 4 effectively acts to absorb this vibration energy by reason of the relative motion, in a direction transverse to the axis of the pinion, which is developed between the damping mass 6 and the journal end portion.

The vibration damping effect of the mass 6 in FIG. 1 is, as noted above, a function of the weight of disk 6. Accordingly, FIG. 2 illustrates means for increasing the effective mass of the vibration damping member. The similarity of the vibration damper of FIG. 2 to that of FIG. 1 will be obvious, the difference being that the disk member 6a is provided with axially extending cylindrical portion 6b disposed in the bore 5.

As will be apparent in FIG. 2, the cylindrical portion 6b defines a substantial radial clearance space 10 with the interior wall of bore 5, so there is no contact therebetween when the mass 6a, 6b vibrates transversely relative to the journal end portion 3. This configuration for the vibration damping mass permits the increase of its weight to the desired extent, simply by lengthening the cylindrical portion 6b, without signficantly increasing the overall axial length of the pinion.

FIG. 3 shows a still further modification of the vibration damping mass of FIG. 1, differing in that the mass 6c projects radially beyond the journal 3 and has an axially extending portion 6d terminating in a relatively flexible end portion 6e, formed by providing a relatively deep internal annular groove 6f. It will be observed that the annular end portion 6e contacts the outer surface of the journal 3, while the axially extending portion 6d defines a substantial radial clearance space 11. By reason of the flexible connection between end portion 6e and the axially extending portion 6d, the mass 6c is relatively free to vibrate to a limited degree in a direction transverse to the axis of the pinion, so as to impose shear forces on the vibration damping layer 8, as described above in connection with FIG. 1. At the same time, the annular portion 6e serves to center the vibration damping mass 6c relative to the journal portion 3 (and also to provide an oil seal which may be required in certain instances).

The vibration damping means of FIGS. 1, 2, 3 are all applied to the extreme end surface of the pinion journal, so they may be readily added to the pinion of a reduction gear already in service, where the noise level is found to be excessive. It should also be noted that vibration dampers of this type are found to be most effective when applied as close as possible to the extreme end portion of the journal.

FIG. 4 illustrates a still further embodiment of the invention, which has the advantage of being housed entirely within the journal portion of the pinion, so as to cause no increase in either diameter or over-all length of the rotor. This modification comprises one or more vibration damping masses supported entirely within the bore 5. In this case, bore 5 does not extend entirely through the rotor, but comprises a drilled hole terminating at the location of the right-hand half of the herringbone pinion 1.

The vibration damper of FIG. 4 comprises a plurality of cylindrical masses 12a, 12b of such diameter as to form a substantial annular clearance space 13 with the bore 5, and supported by a plurality of axially-spaced disk members 14a, 14b, 14c of a diameter to snugly engage the bore 5. Disposed between the respective ends of the vibration damping masses 12a, 12b and the supporting disks 14a, 14b, 14c are layers of vibration damping material 15a, 15b, 15c, 15d.

The vibration damping masses and supporting disks are secured together by support means comprising a central threaded rod 16, which projects entirely through a stack of disks, weights, and vibration damping washers, with self-locking nuts 17, 18 at either end thereof. The disk members 14a, 14b, 14c have an internal thread engaging the threaded rod 16. Likewise, the central portion only of the masses 12a, 12b define reduced diameter portions 19 threadedly engaging the support rod 16. The remainder of the bore in the cylindrical masses 12a, 12b defines substantial circumferential clearance spaces 20, 21 with the threaded support rod. Thus, each mass 12a, 12b is resiliently supported at its central portion so as to be free to vibrate transversely to the axis of the rotor by a limited amount, to impose vibration-absorbing shear forces on the damping material 15a, 15b, 15c, 15d.

A special advantage of the threaded rod support means for the vibration damping cylinders 12a, 12b is that, with the vibration damping cylinder 12a threadedly engaging the support rod, the nut 17 may be tightened against disk 14a to an extent to apply a desired compression loading on the vibration-absorbing material 15a. Likewise, the threaded support disk 14b may be turned on the threaded rod 16 so as to apply a similar compression load to the vibration absorbing washer 15b. Thus, all the vibration absorbing washers can be preloaded in compression to the degree found effective to develop the optimum vibration absorbing characteristics.

It remains to note that the supporting rod 16 has a left-hand end engaging the bottom 5a of the bore 5, while the right-hand end engages a cover plate 22 which closes the bore 5 and is secured by a number of threaded fastenings 23. Thus the vibration-damping assembly is positively located axially in the bore 5.

It is of interest to note a few significant design criteria which are important to the arrangement of FIG. 4. In the first place, as noted above in connection with FIGS. 1–3, the vibration damping masses 12a, 12b are most effective if disposed as close as possible to the extreme end portion of the journal 3. Since this is the lowest stressed portion of the rotor, the bore 5 can be made as large as possible so as to accommodate masses 12a, 12b having the maximum feasible diameter. In other words, it is desired to make the vibration damping masses 12a, 12b of as large diameter as is possible to increase their weight, while preserving the requisite strength for the pinion journal portion 3.

It is also important to note that the vibration damping masses 12a, 12b should not be too long relative to their diameter, since otherwise they may exhibit a natural vibration frequency of their own, which may result in development of an independent vibration condition in the vibration damping masses and reduce their effectiveness. Specifically, the masses 12a, 12b have a length on the order of twice their diameter, and these proportions are found to be effective. It would of course be possible to use three or more of the vibration damping cylinders like 12a, 12b if additional vibration damping mass is required. As indicated above, the optimum appears to be an aggregate vibration damping mass on the order of 5% of the total weight of the rotor.

The vibration damping masses are preferably fabricated of a dense steel alloy having good dimensional stability with respect to temperature changes, and low creep characteristics under centrifugal stresses. This is important since any shape deformation of the vibration damping masses might result in unbalance of the rotor, which would increase the vibration rather than reduce it as intended.

It will be seen that the vibration damping means of FIG. 4 may also be conveniently applied in the field to a gear pinion which is found to be objectionably noisy, since it is only necessary to provide the bore 5 in the journal end portion, with no increase in over-all diameter or axial length of the rotor.

The vibration dampers may be applied to both ends of the rotor, in appropriate cases, instead of just one end as described herein. Pinion vibration damping devices in accordance with the invention have been found to be extremely effective, the noise and vibration levels being as little as 1/64 of the levels experienced without the damping devices. Thus, it will be seen that the invention provides effective noise and vibration suppressing means which are readily applied to noisy pinions already in service, capable of providing the amount of mass found necessary to effectively damp vibrations, and providing means for damping vibrations without resorting to a substantial increase in over-all axial length of the gear pinion.

While several embodiments of vibration damping means in accordance with the invention have been described, it will be obvious that numerous modifications and substitutions of equivalents may be made. It is of course intended to cover by the appended claims all such modifications as fall within the true spirit and scope of the invention.

What I claim as new and desire to secure by Letters Patent of the United States is:

1. In a rotor member having a bearing journal portion adjacent at least one end thereof, the over-all length of the rotor being at least on the order of four times the rotor diameter and subject to vibration-inducing impulses in operation, the combination of:

vibration-damping means mounted on the end journal portion and comprising at least one cylindrical member having substantial mass relative to the mass of the rotor, and means supporting the cylindrical member coaxially with and in spaced relationship to the journal portion to effect limited motion thereof relative to the journal in a direction transverse to the axis of the axis of the rotor when the rotor vibrates, said support means including vibration-absorbing material disposed in contact with an end surface of the cylindrical member, whereby relative vibratory motion between the journal and cylindrical member effects imposition of shear forces within the vibration-damping material to absorb vibration energy from the rotor member.

2. A vibration-damped rotor in accordance with claim 1, in which the weight of the vibration damping means is on the order of 5% of the total weight of the rotor.

3. In a rotor member of substantial axial length relative to its diameter and having a bearing journal portion adjacent at least one end thereof and subject to vibration-inducing impulses in operation, the combination of:
vibration-damping means connected to an end journal portion and comprising a cylindrical member having substantial mass relative to the mass of the rotor,
means supporting said cylindrical member on the end of the rotor journal portion and coaxially therewith to effect limited motion thereof relative to the journal in a direction transverse to the axis of the rotor when the rotor vibrates,
and vibration-absorbing material disposed between the cylindrical member and journal end portion, whereby relative vibratory motion between the journal and cylindrical member effects imposition of shear forces within the vibration-damping material for absorbing vibration energy from the rotor member.

4. Rotor vibration damping means in accordance with claim 3 in which the supporting means for the vibration damping cylindrical member includes a plurality of bolt members axially disposed and projecting freely through holes in the cylindrical member and each having an end portion connected to the end portion of the rotor, whereby the unsupported length of the bolt members effects limited relative vibratory motion of the cylindrical member in a direction transverse to the axis of the rotor to impose vibration-absorbing shear forces within the vibration-absorbing material.

5. Rotor vibration damping means in accordance with claim 3 in which the rotor end portion defines an axial cylindrical recess and the cylindrical vibration damping member has a cylindrical projection extending freely into said recess with substantial radial clearance therebetween, whereby limited vibratory motion of the cylindrical member in a direction transverse to the axis of the rotor may take place to impose shear forces within the vibration-absorbing material.

6. A vibration-damped rotor member of substantial axial length relative to its diameter and having a bearing journal portion adjacent at least one end thereof and subject to vibration-inducing impulses in operation,
said bearing journal end portion defining a central cylindrical axially extending recess,
and a vibration damping device disposed in said journal end recess and comprising two axially spaced disk members disposed transversely in said cylindrical recess and engaging the walls thereof,
a cylindrical member disposed coaxially between said disk members and defining a substantial circumferential clearance with the walls of said recess,
a vibration damping material disposed between one end of the cylindrical member and the adjacent surface of the adjacent disk members,
and means supporting the cylindrical member coaxial with said recess and disk members and including a ceintral axial rod member having end portions secured relative to said respective disk members,
the cylindrical member having an axial bore therethrough including bore end portions of a diameter larger than the support rod member, so as to define circumferential clearance spaces therewith,
the intermediate portion of the bore in the cylindrical member engaging the support rod member, whereby the cylindrical member is free to vibrate to a limited degree in a direction transverse to the axis of the rotor to impose vibration-absorbing shear forces on the vibration-absorbing material.

7. A vibration-damped rotor member of substantial axial length relative to its diameter and having a bearing journal portion adjacent at least one end thereof and subject to vibration-inducing impulses in operation, said bearing journal end portion defining a central cylindrical axially extending recess,
a plurality of vibration damping devices disposed in said journal end recess and comprising
a plurality of vibration damping devices disposed transversely in said cylindrical recess and engaging the walls thereof,
a plurality of cylindrical members each disposed coaxially between an adjacent pair of disk members and defining a circumferential clearance space with the walls of said recess,
vibration damping material disposed between at least one end of the respective cylindrical members and the adjacent surfaces of the respective disk members,
means supporting the cylindrical members coaxial with said recess and the disk members and including a central axial rod member projecting through said cylindrical members and disk members and secured relative to the disk members,
each cylindrical member having an axial bore therethrough including end portions of a diameter larger than the support rod so as to define circumferential clearance spaces therewith, the intermediate portion of the bore of each cylindrical member engaging the support rod, whereby each cylindrical member is free to vibrate to a limited degree in a direction transverse to the axis of the rotor to impose vibration-absorbing shear forces within the vibration-absorbing material,
said support rod projecting from either end of the end disk members, one rod end portion engaging the bottom of the recess in the journal end portion, and
a cover member closing the open end of the journal end recess and engaging the adjacent projecting end portion of the support rod, whereby the assembly of vibration-damping cylinders is restrained from axial movement relative to the rotor.

References Cited by the Examiner
UNITED STATES PATENTS

| | | | |
|---|---|---|---|
| 1,191,907 | 7/16 | Northup | 74—443 |
| 1,427,721 | 8/22 | Christenson | 74—443 |
| 1,916,085 | 6/33 | Summers et al. | |
| 2,636,399 | 4/53 | O'Connor | 74—574 |
| 2,960,189 | 11/60 | Osborn | 74—574 X |

BROUGHTON G. DURHAM, *Primary Examiner.*

MILTON KAUFMAN, *Examiner.*